June 28, 1949.  E. P. WUNSCH  2,474,610
QUANTITATIVE DECELERATION INDICATOR
Filed May 29, 1945  2 Sheets-Sheet 1
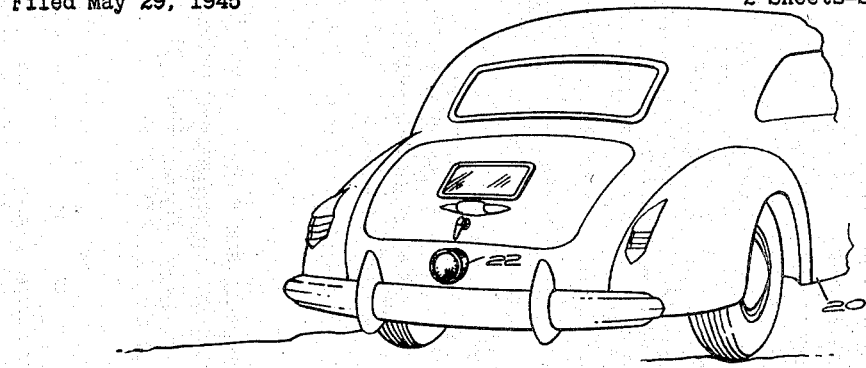
Fig. 1
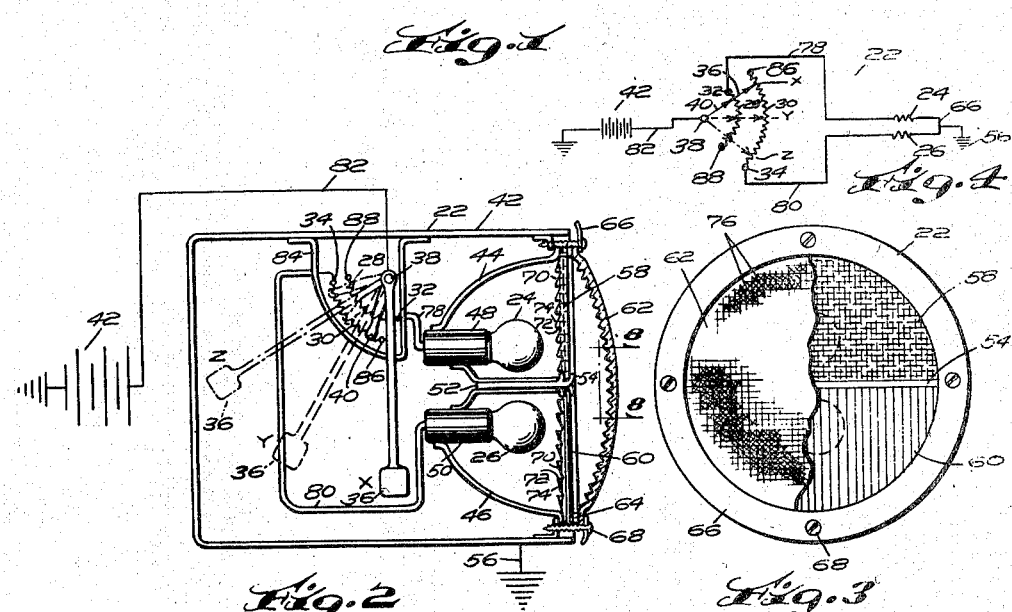
Fig. 2  Fig. 3
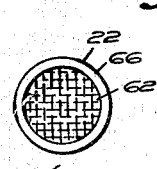 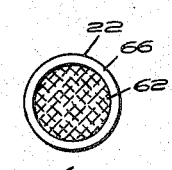 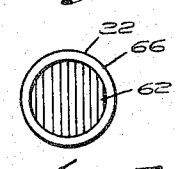
Fig. 5  Fig. 6  Fig. 7
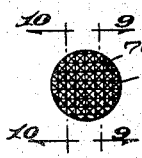 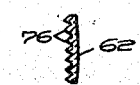 
Fig. 8  Fig. 9  Fig. 10
INVENTOR
Elton P. Wunsch
BY
Thomas A. Jenckes
ATTORNEY June 28, 1949.  E. P. WUNSCH  2,474,610
QUANTITATIVE DECELERATION INDICATOR
Filed May 29, 1945  2 Sheets-Sheet 2

INVENTOR.
Elton P. Wunsch
BY Thomas A. Jenske
Attorney

Patented June 28, 1949

2,474,610

UNITED STATES PATENT OFFICE 2,474,610

QUANTITATIVE DECELERATION INDICATOR

Elton P. Wunsch, Providence, R. I.

Application May 29, 1945, Serial No. 596,480

8 Claims. (Cl. 177—311.5)

My invention relates to improvements in quantitative deceleration indicators particularly adapted for use on the rear of vehicles such as automobiles.

At the present time automobiles are provided with so-called stop lights which are usually lighted by the completion of a circuit when the brake pedal is depressed. When following an automobile at night the stop light gives the same signal whether the operator momentarily puts his foot on the brake or whether he puts all his weight on the brake for a sudden stop. This failure of the standard type of stop lights to give any indication of the rate of deceleration has resulted in many accidents.

An object of my invention therefore is to provide a quantitative deceleration indicator which through a mechanism operable by gravity or the inertia of the car independent of the manual controls such as the manually actuated means for actuating the brake or clutch will give a true indication of the actual deceleration of the vehicle.

A further object of my invention is to provide a deceleration indicator which will indicate the rate of deceleration in a clear cut manner, namely by indicating distinctly different colors for different rates of deceleration. I believe that I am the first to employ a plurality of light sources, means to project different colored rays from each of said light sources in the same direction whereby each light source may indicate opposite extremes of deceleration, means to blend and diffuse the projected rays for each light source in said direction and means responsive to the rate of deceleration for inversely varying the intensity of each light source from a minimum to a maximum amount of deceleration whereby the blended rays successively transmitted from said indicator may indicate quantitative rates of deceleration.

A further object of my invention therefore is to not only quantitatively designate the rate of deceleration on any one uniform deceleration but also to successively indicate any changes in deceleration which successively may take place in the driving or stopping of the automobile.

A further object of my invention relates to the specific construction of the component parts of my improved combination such as the structure of variable resistances, blending lenses, etc. I employ in my improved combination, so that the parts thereof may cooperate structurally as well as functionally to insure a compact, readily attachable device, having a simplicity of parts insuring continuity of operation.

These and such other objects of my invention as may hereinafter appear will be best understood from a description of the embodiments thereof shown in the accompanying drawings.

In the drawings,

Fig. 1 is a rear perspective view of an automobile with my improved quantitative deceleration indicator attached.

Fig. 2 is a vertical sectional view taken centrally through my preferred embodiment of quantitative deceleration indicator with certain parts shown in elevation and also showing partially schematically the electrical connections.

Fig. 3 is a rear view thereof with a portion of the diffusing lens broken away.

Fig. 4 is an electrical diagram illustrating the electrical operation of the preferred embodiment of my invention shown in Figs. 2 and 3.

Figs. 5, 6 and 7 are reduced diagrammatic views of the rear end of my improved deceleration indicator; Fig. 5 showing the yellow light emitted thereby when there is a slight deceleration with the pendulum in the full line position as shown in Fig. 2; Fig. 6 showing the blended orange light emitted thereby when the yellow and red bulbs are of equal intensity at substantially half deceleration with the pendulum in the mid position having the contact finger actuated thereby substantially bisecting the resistances as shown in dash lines in Fig. 2; and Fig. 7 showing the red light emitted thereby when there is a maximum amount of deceleration and the pendulum is moved to the dash-dot extreme position as shown in Fig. 2.

Fig. 8 is a reverse view of a portion of the inside of the light diffusing lens taken along the line 8—8 of Fig. 2.

Fig. 9 is a vertical sectional view through the light diffusing lens intermediate the pyramids thereof taken along the line 9—9 of Fig. 8.

Fig. 10 is a vertical sectional view centrally of the light reflecting pyramids thereof taken along the line 10—10 of Fig. 8.

Figure 11:
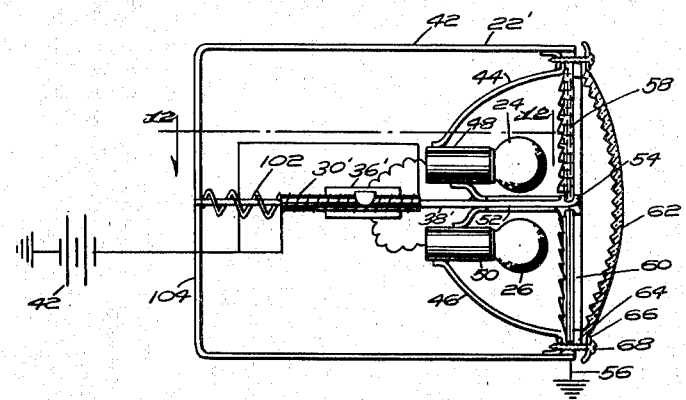

Fig. 11 is a vertical sectional view generally similar to Fig. 2 of a different embodiment of my invention.

Figure 12:
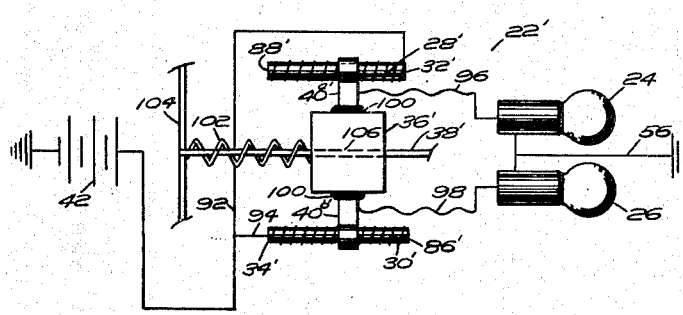

Fig. 12 is a diagrammatic skeleton plan view thereof taken along the line 12—12 of Fig. 11.

Figure 13:
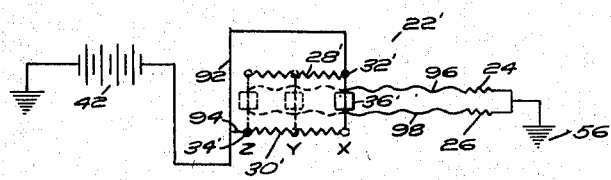

Fig. 13 is an electrical diagram of the embodiment of my invention shown in Figs. 11 and 12.

In the drawings, wherein like characters of reference generally indicate like parts throughout, 20 generally indicates an automobile having my improved quantitative deceleration indicator 22 or 22' attached. As stated hitherto, my improved deceleration indicator is adapted to be attached to the rear of a vehicle such as an automobile in place of or in addition to the usual stop light. Broadly speaking, my invention includes two separate light sources 24 and 26 as shown in both embodiments, means to project different colored rays from each of said light sources in the same direction whereby each light source may indicate opposite extremes of deceleration, means to blend and diffuse said projected rays in said direction, and means responsive to the rate of deceleration for inversely varying the intensity of each light source from a minimum up to a maximum amount of deceleration whereby the blended rays successively transmitted from the said indicator 22 may indicate quantitative rates of deceleration.

In both embodiments said last mentioned means includes the two electrical resistances 28 and 30 as shown in Figs. 2 to 10 or 28' and 30' as shown in Figs. 11 to 13 arranged adjacent to and in inverse relationship to each other having low resistance ends 32 and 34 or 32' and 34'. In all embodiments I provide gravity actuated means comprising the pendulum 36 pivotally mounted at the point 38 as in the embodiment shown in Figs. 2 to 10 or the weight 36' slidably mounted on the guide 39' in the embodiment shown in Figs. 11 to 13, in both embodiments being freely movable forwardly on deceleration of the vehicle. I also provide contact finger means comprising the contact finger 40 pivotally mounted on the same pivot 38 and rigidly connected to the pendulum 36 to pivot therewith over the resistances 28 and 30 in the embodiment shown in Figs. 2 to 10 or the contact fingers 40a' and 40b' projecting laterally from the weight 36' adapted to move forwardly with the weight 36' over the resistances 28' and 30' in the embodiment shown in Figs. 11 to 13.

I also provide suitable lines connectable to a source of electricity 42, when employed in an automobile, to the usual storage battery, connected to said movable contact finger means 40 or 40a' and 40b', the low resistance ends 32 and 34 or 32' and 34' of the respective resistances and the lamps 24 and 26 to impart increasing amounts of current to one lamp 26 and proportionate decreasing amounts of current to the other lamp 24 on deceleration of the vehicle. I also provide means to make said lamps emit different colors and means to project and blend the different colored rays projected from said lamps in one direction.

Both embodiments of my invention are adapted for use with an automobile and my invention is particularly constructed to provide a compact structure which may be substituted for the usual stop light or used in addition thereto. For this purpose all operative parts of my invention are usually enclosed in a standard casing 42 adapted to face rearwardly of the vehicle and having an open rear end. I provide the two substantially hemiparabolic reflectors 44 and 46 facing rearwardly and sealing the open rear end of the casing 42 each having a lamp socket 48 and 50 containing the respective lamps 24 and 26 so that the bulbs thereof will be located in the desired focusing position within respective reflectors 44 and 46. In the embodiment shown, I provide a partition 52 electrically connected to the sockets 48 and 50 connected to the lens separating bar 54 which in turn is connected to the casing 42 which is suitably grounded as at 56.

As stated, I provide means to make said lamps 24 and 26 emit different colors. While any suitable type of means may be provided for this purpose, I preferably provide a lens 58 of one color, preferably yellow, in rear of the lamp 24 and a lens 60 of a different color, preferably red, as shown in rear of the lamp 26. Each of said lenses is preferably hemicircular so that the upper yellow lens 58 may be mounted above the crossbar 54 and the lower red lens may be mounted below the lower crossbar 54 in rear of their respective lamps 24 and 26 and reflectors 44 and 46. In the embodiment shown, as means to project and blend the different colored rays projected from said lamps, I provide in addition to the reflectors 44 and 46 hitherto described, a light diffusing lens 62 completely covering the open rear end of the casing 42 in rear of the lenses 58 and 60, said lenses being suitably mounted in rear of said reflectors in any suitable manner such as by the ring gasket 64, the ring frame 66 and set screws 68. The red and yellow lenses 58 and 60 preferably have the inner surfaces provided with the horizontal flutes 70. In the embodiments shown these flutes have the perpendicular side walls 72 and the oblique side walls 74 for more effectively projecting and diffusing the light.

While any suitable type of a light diffusing lens 62 may be employed, preferably one having a roughened inner surface, in the embodiment shown I have shown a lens with vertically and horizontally aligned small square pyramids 76 on the inner surface thereof which I have found satisfactory for this purpose.

I have so connected up the respective parts to the storage battery 42 that the resistances will impart inversely varying degrees of intensity to the lamps 24 and 26 on deceleration of the vehicle. As typical of the fact that various connections may be used, I have shown the parts in the different embodiments connected up entirely differently. In the embodiment shown in Fig. 2, the lamps 24 and 26 are connected respectively to the low resistance ends 32 and 34 of the resistances 28 and 30 by the wires 78 and 80 respectively and the contact finger 40 is connected to the storage battery 42 by the wire 82. If desired the resistances may be encased within a casing 84 having suitable holes for the wires and a longitudinal slot for the pendulum 36 which may be located anywhere on the vehicle but preferably in the casing 42 immediately ahead of the lamps 24 and 26.

Thus as shown in Figs. 2 to 7, when there is no deceleration of the vehicle, the pendulum 36 is in the vertical full line position $x$ as shown in Fig. 2 and the contact finger 40 is at the high resistance end 86 of the rheostat 30 and at the low resistance end 32 of the rheostat 28, thereby transmitting current to provide a bright light in the lamp 24 which is transformed by the lens 58 into the predominent yellow light diffused through the lens 62 as shown in Fig. 5, and due to the fact that the contact finger 40 is at the high resistance end 86 of the resistance 30 connected to the lamp 26 there will be substantially no light diffused through the red lens 60 to vary the pure yellow color transmitted as shown in Fig. 5. When there is an intermediate amount of deceleration the pendulum 36 will assume an intermediate position $y$ shown in Figs. 2 and 4 with the resistances 28 and 30 half connected thereby transmitting equal amounts of light through the respective lamps 24 and 26 and respective lenses 58 and 60 to be diffused by the lens 62 into the orange light shown in Fig. 6. When however the pendulum is moved to its extreme front position, namely the dash-dot position z shown in Figs. 2 and 4, the contact finger 40 will be at the low resistance end 34 of the rheostat 30 transmitting a high intensity of current to the light 26 causing a predominant red light to be transmitted through the red lens 60 and the diffusing lens 62 as shown in Fig. 7. At this instant however as the contact finger 40 is adjacent the high resistance end 88 of the resistance 28 connected to the lamp 24 it is obvious that this will burn with such slight intensity that substantially no yellow light will be transmitted through the yellow lens 58 through the diffusing lens 62 indicating a maximum amount of deceleration.

The embodiment shown in Figs. 11 to 13 works in similar fashion. In this instance, however, the storage battery 42 is connected by the wire 92 to the low resistance end 32' of the resistance 28' for the lamp 24 and by the wire 94 connected to the low resistance end 34' of resistance 30' for the lamp 26. In this instance the respective lamps 24 and 26 are connected to the respective contact fingers 40a' and 40b' for the respective resistances 28' and 30' by the flexible wires 96 and 98 respectively and the contact fingers 40a' and 40b' are insulated from each other preferably by the insulating collars 100 on which they are mounted on the weight 36'. The operation of the device shown in Figs. 11 to 13 is identical to that of the device shown in Figs. 2 to 7. When the weight 36' is in the rest position x, the light 24 will burn brightly and the light 26 burn dimly causing the yellow light to be transmitted through the lens 62. At the mid position y the contact fingers 40a' and 40b' will be at their mid position y to cause equal amounts of light to be transmitted through the lamps 24 and 26 to be projected and blended through the projecting lens 62 to produce the orange intermediate color shown in Fig. 6. When the weight 36' has assumed the dash-dot position z showing the maximum amount of deceleration it is obvious that light 26 will burn intensely and the light 24 will be dimmed making the red lens 60 cause the predominant red color to be shown in the device as shown in Fig. 7. In this embodiment, the weight 36' acts against a spring 102 interposed between the front wall 104 of the casing 42 and the weight 36'. This spring 102 creates an opposing force to the weight 36' directly proportional to the deceleration that initially causes the weight 36' to move forwardly. The spring 102 also returns the weight 36' to its initial position. The weight 36' rides on the guideway 38' which in the embodiment shown comprises a rod 38' projecting through a hole 106 centrally of the weight 36'. The front end of the rod 38' may be suitably mounted in the partition 54 and the rear end suitably mounted as shown in the front wall 104 of the casing.

It is thus apparent that I have provided a novel type of quantitative deceleration indicator with the advantages explained above.

It is understood that my invention is not limited to the specific embodiments shown and that various deviations may be made therefrom without departing from the spirit and scope of the appended claims.

What I claim is:

1. A quantitative deceleration indicator, comprising two light sources, means to project different colored rays from each of said light sources in the same direction whereby each light source may indicate opposite extremes of deceleration, means to continuously blend and diffuse said projected rays in said direction, and means responsive to the rate of deceleration for inversely varying the intensity of each light source from a minimum up to a maximum amount of deceleration whereby the blended rays successively transmitted from said indicator may indicate quantitative rates of deceleration.

2. A quantitative deceleration indicator, comprising two light sources, means to project different colored rays from each of said light sources in the same direction whereby each light source may indicate opposite extremes of deceleration, means to continuously blend and diffuse said projected rays in said direction, a source of electric current, lines connecting each of said light sources therewith having inversely variable resistances therein, and means for jointly inversely varying the resistances in response to the degree of deceleration to inversely vary the intensity of each light source from a minimum up to a maximum amount of deceleration whereby the blended rays transmitted from said indicator may indicate quantitative rates of deceleration.

3. A quantitative deceleration indicator, comprising a casing adapted to face rearwardly of a vehicle, two substantially hemi-parabolic reflectors having lamp sockets each containing an electric lamp mounted in the rear of said casing, two electrical resistances mounted within said casing adjacent to and in inverse relationship to each other, having opposite low resistance ends connected to each respective lamp socket, a pendulum pivotally mounted in said casing to freely pivot forwardly in said casing, a contact finger connectable to a source of electricity rigidly connected with said pendulum to move therewith over said resistances to impart increasing amounts of electricity to one lamp and proportionately decreasing amounts of electricity to the other lamp on deceleration of the vehicle, a lens of one color in rear of one lamp and its reflector, a lens of a different color in rear of the other lamp and its reflector and a blending lens having a roughened light diffusing inner surface forming the rear wall of said casing in rear of said different colored lenses.

4. A quantitative deceleration indicator, comprising two substantially semi-parabolic reflectors having lamp sockets each containing an electric lamp, two electrical resistances adjacent to and in inverse relationship to each other, having opposite low resistance ends connected to each respective lamp socket, a freely pivoted pendulum, a contact finger connectable to a source of electricity rigidly connected with said pendulum to move therewith over said resistances to impart increasing amounts of electricity to one lamp and proportionately decreasing amounts of electricity to the other lamp on deceleration of the vehicle, a lens of one color in front of one lamp and its reflector, a lens of a different color in front of the other lamp and its reflector and a blending lens having a roughened light diffusing inner surface in front of said different colored lenses.

5. A quantitative deceleration indicator, comprising a casing adapted to face rearwardly of a vehicle, two substantially semi-parabolic reflectors having lamp sockets each containing an electric lamp mounted in rear of said casing, two electrical resistances mounted within said casing adjacent to and in inverse relationship to each other, gravity actuated means mounted in said casing to freely move forwardly, contact finger means rigidly connected with said gravity actuated means to move therewith over said resistances, lines connectable to a source of electric current connected to said movable contact finger means, low resistance ends of said resistances and lamps to impart increasing amounts of electricity to one lamp and proportionately decreasing amounts of electricity to the other lamp on deceleration of the vehicle, a lens of a different color in rear of one lamp and its reflector, a lens of a different color in rear of the other lamp and its reflector and a blending lens having a roughened light diffusing inner surface forming the rear wall of said casing in rear of said different colored lenses.

6. A quantitative deceleration indicator, comprising two substantially hemi-parabolic reflectors having lamp sockets each containing an electric lamp, two electrical resistances adjacent to and in inverse relationship to each other, gravity actuated means freely movable forwardly, contact finger means rigidly connected with said gravity actuated means to move therewith over said resistances, lines connectable to a source of electric current connected to said movable contact finger means, low resistance ends of said resistances and lamps to impart increasing amounts of electricity to one lamp and proportionately decreasing amounts of electricity to the other lamp on deceleration of the vehicle, a lens of one color in front of one lamp and its reflector, a lens of a different color in front of the other lamp and its reflector and a blending lens having a roughened light diffusing inner surface in front of said different colored lenses.

7. A quantitative deceleration indicator for vehicles comprising two electric lamps, two electrical resistances arranged substantially parallel and in inverse relationship to each other, inertia actuated means freely movable substantially in a straight line forwardly on deceleration of the vehicle, a finger projecting laterally from each side of and insulated from said gravity actuated means to contact a respective resistance, lines connectable to a source of electric current connected to said low resistance ends of said resistances and flexible lines connecting said contact finger means and lamps to impart increasing amounts of electricity to one lamp and proportionate decreasing amounts of electricity to the other lamp on deceleration of the vehicle, means to make said lamps emit different colors and means to continuously project and blend the different colored rays from said lamps in one direction.

8. A quantitative deceleration indicator for vehicles, comprising two electric lamps, two electrical resistances arranged in similar arcuate formation and in inverse relationship to each other having opposite low resistance ends connected to each respective lamp, a pendulum freely pivotable on deceleration of the vehicle, contact finger means connected to said pendulum to move therewith arcuately over said resistances, and lines connectable to a source of electric current connected to said movable contact finger means to impart increasing amounts of electricity to one lamp and proportionate decreasing amounts of electricity to the other lamp on deceleration of the vehicle, means to make said lamps emit different colors and means to continuously project and blend the different colored rays from said lamps in one direction.

ELTON P. WUNSCH.

REFERENCES CITED

The following references are of record in the file of this patent:

UNITED STATES PATENTS

| Number | Name | Date |
|---|---|---|
| 1,930,744 | Scherfee | Oct. 17, 1933 |
| 2,354,888 | Smith | Aug. 1, 1944 |

FOREIGN PATENTS

| Number | Country | Date |
|---|---|---|
| 322,914 | Great Britain | Dec. 19, 1929 |